(12) United States Patent
Talcott et al.

(10) Patent No.: US 11,787,555 B2
(45) Date of Patent: Oct. 17, 2023

(54) FUEL DAMS, AIRCRAFT WING BOXES, AIRCRAFT, AND METHODS OF ASSEMBLING AIRCRAFT WINGS

(71) Applicant: The Boeing Company, Chicago, IL (US)

(72) Inventors: Kristopher William Talcott, Seattle, WA (US); Mark Abdouch, Mukilteo, WA (US); Matthew McKinley Whitmer, Seattle, WA (US); Fernando L. Perez Diaz, Everett, WA (US); Mark Edmund Richardson, Issaquah, WA (US); Alexander S. Sukhomlinov, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/402,098

(22) Filed: Aug. 13, 2021

(65) Prior Publication Data

US 2023/0045886 A1 Feb. 16, 2023

(51) Int. Cl.
*B64D 37/08* (2006.01)
*B64C 3/34* (2006.01)
*B64C 3/18* (2006.01)

(52) U.S. Cl.
CPC .............. *B64D 37/08* (2013.01); *B64C 3/182* (2013.01); *B64C 3/185* (2013.01); *B64C 3/187* (2013.01); *B64C 3/34* (2013.01)

(58) Field of Classification Search
CPC ........... B64C 3/18; B64C 3/182; B64C 3/185; B64C 3/187; B64C 3/34; B64D 37/08
See application file for complete search history.

(56) References Cited

U.S. PATENT DOCUMENTS

| 8,167,245 | B1 | 5/2012 | Koehler et al. |
| 9,815,562 | B2* | 11/2017 | Yamaguchi ............ B64D 37/08 |
| 10,279,922 | B2 | 5/2019 | Perez Diaz et al. |
| 10,317,886 | B1* | 6/2019 | Arthur ............ G05B 19/41805 |
| 2012/0241560 | A1* | 9/2012 | Erickson .................. B64C 1/26 |
| | | | 285/285.1 |

(Continued)

FOREIGN PATENT DOCUMENTS

| EP | 2502824 A2 | 9/2012 |
| EP | 3205986 A1 | 8/2017 |

(Continued)

OTHER PUBLICATIONS

European Patent Office, Extended European Search Report for related European patent application EP 22 186 542 dated Feb. 20, 2023.

*Primary Examiner* — Joshua J Michener
*Assistant Examiner* — Ka Chun Leung
(74) *Attorney, Agent, or Firm* — Kolitch Romano Dascenzo Gates LLC

(57) ABSTRACT

Methods of assembling an aircraft wing includes adhering fuel dams to stringers and adhering the fuel dams to ribs. Fuel dams include a fuel-dam body that defines a channel shaped to receive a portion of a stringer of an aircraft wing. The fuel-dam body includes a stringer adherent surface, a rib adherent surface, and a pair of spaced-apart flanges extending from the rib adherent surface and positioned to project from the rib adherent surface on opposing sides of a notch of a rib.

20 Claims, 5 Drawing Sheets

(56) References Cited

U.S. PATENT DOCUMENTS

2016/0207638 A1* 7/2016 Valenzuela .............. G01C 7/00
2017/0371989 A1   12/2017 Lester et al.
2020/0164959 A1*  5/2020 Edwards ................ B64D 37/06

FOREIGN PATENT DOCUMENTS

| EP | 3450321 A1 | 3/2019 |
| EP | 3656657 A1 | 5/2020 |
| EP | 3766784 A1 | 1/2021 |

* cited by examiner

200 ↘

- 210 — COUPLING STRINGERS TO SKIN
- 212 — ACQUIRING SURFACE CONTOUR DATA OF STRINGERS
- 214 — ACQUIRING SURFACE CONTOUR DATA OF RIBS
- 216 — REFINING COMPUTER MODELS OF FUEL DAMS
  - 218 — DEFINING ADHERENT SURFACES
  - 220 — DEFINING SPATIAL RELATIONSHIPS
- 222 — MANUFACTURING FUEL DAMS
- 228 — INDEXING
- 202 — ADHERING FUEL DAMS TO STRINGERS
  - 206 — ADHERING IN PREDETERMINED LOCATIONS
- 230 — FASTENING FUEL DAMS TO STRINGERS
- 204 — ADHERING FUEL DAMS TO RIBS
  - 208 — POSITIONING WITHIN NOTCHES
  - 224 — POSITIONING FLANGES
  - 226 — CONTAINING ADHESIVE SQUEEZEOUT

FIG. 12

FUEL DAMS, AIRCRAFT WING BOXES, AIRCRAFT, AND METHODS OF ASSEMBLING AIRCRAFT WINGS

FIELD

The present disclosure relates to fuel dams of aircraft wings.

BACKGROUND

Typical wing construction includes front and rear spars, ribs that are spaced apart and extend between the spars, stringers that are spaced apart and extend transverse to the ribs, and skins that are coupled to the stringers. When wings are used as fuel tanks, fuel dams may be used at interfaces between the stringers and tank end ribs to prevent fuel from passing through the interfaces and at interfaces between the stringers and fuel control ribs to restrict fuel from passing through the interfaces. Traditionally, installation of the fuel dams is performed after the wing box is already constructed, requiring technicians to enter the confined space of the wing box and making the installation difficult and time consuming.

SUMMARY

Fuel dams, aircraft wing boxes, aircraft, and methods of assembling aircraft wings are disclosed.

Fuel dams comprise a fuel-dam body that defines a channel that is shaped to receive a portion of a stringer of the aircraft wing. The fuel-dam body comprises a stringer adherent surface, a rib adherent surface, and a pair of spaced-apart flanges. The stringer adherent surface defines the channel and is shaped to be adhered to the portion of the stringer of the aircraft wing. The rib adherent surface is shaped to be adhered to a rib of the aircraft wing within a notch of the rib. The spaced-apart flanges extend from the rib adherent surface and are positioned to project from the rib adherent surface on opposing sides of the notch of the rib.

Aircraft wing boxes comprise spars, ribs, stringers, and fuel dams. The ribs extend between the spars and comprise notches. The stringers extend transverse to the ribs and are positioned partially within the notches. The fuel dams are positioned at interfaces between the stringers and the notches of at least a subset of the ribs.

Aircraft comprise a fuselage and wings supported by the fuselage, with each wing comprising an aircraft wing box.

Methods of assembling aircraft wings comprise adhering fuel dams to stringers and adhering the fuel dams to ribs.

BRIEF DESCRIPTION OF THE DRAWINGS

FIG. 12 is a flowchart schematically representing methods of assembling an aircraft wing.

DESCRIPTION

Figure 1:
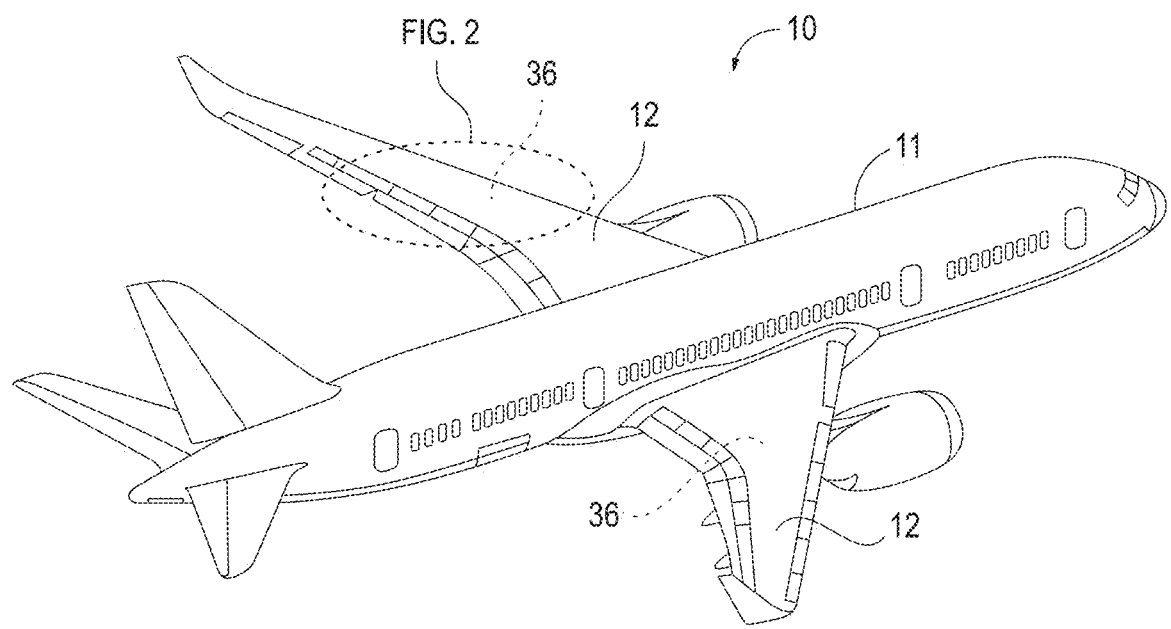
FIG. 1 is an illustration of an example aircraft.
Figure 2:
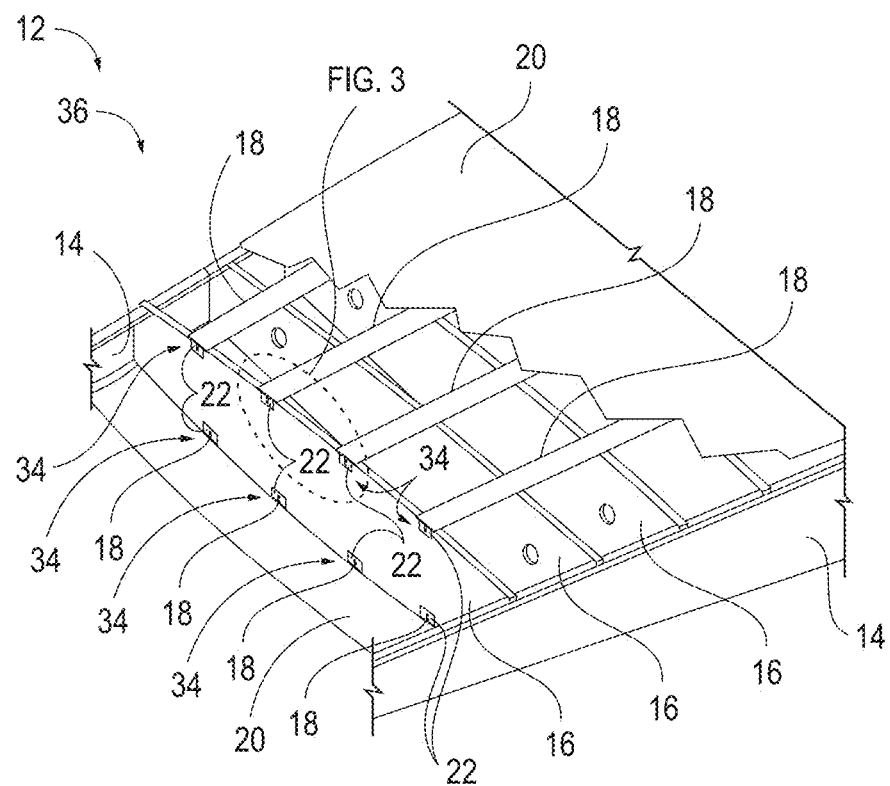
FIG. 2 is a fragmentary view of an example wing box of an aircraft.
Figure 3:
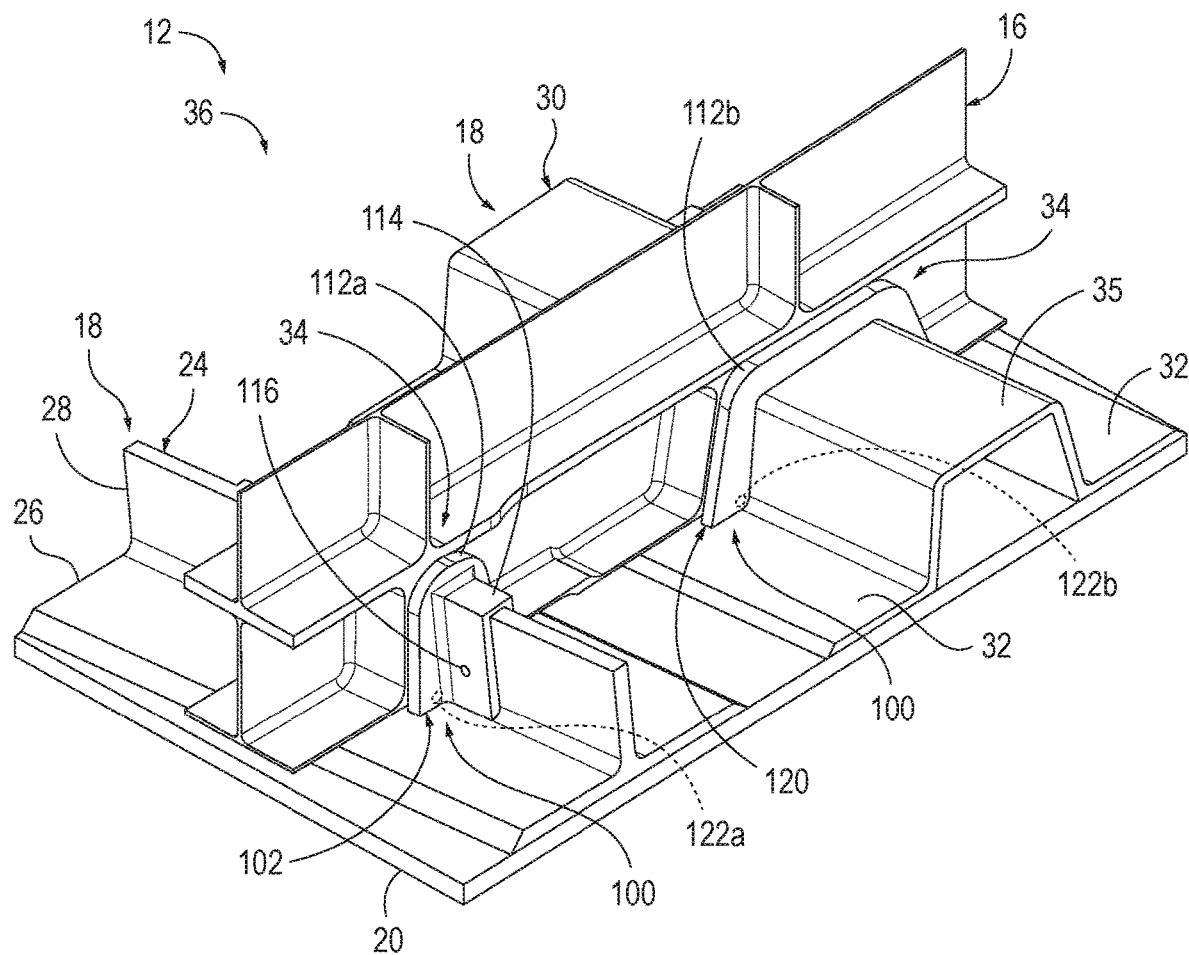
FIG. 3 is an isometric view of a portion of an example wing box of an aircraft.
Figure 4:
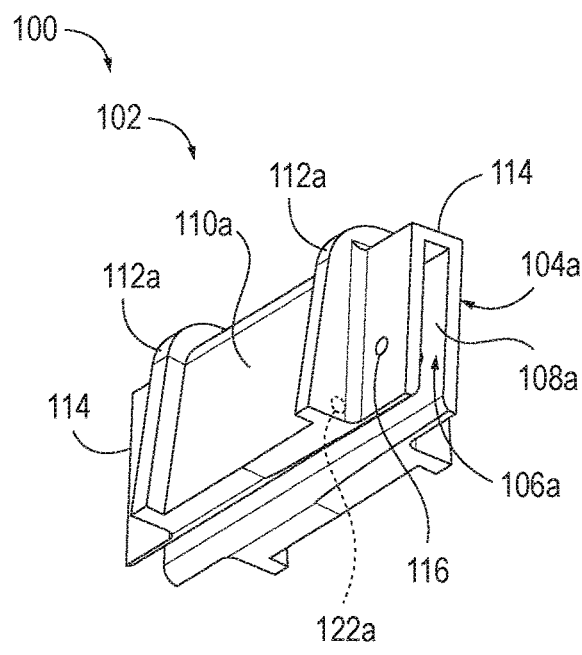
FIG. 4 is an isometric view of an example fuel dam.
Figure 5:
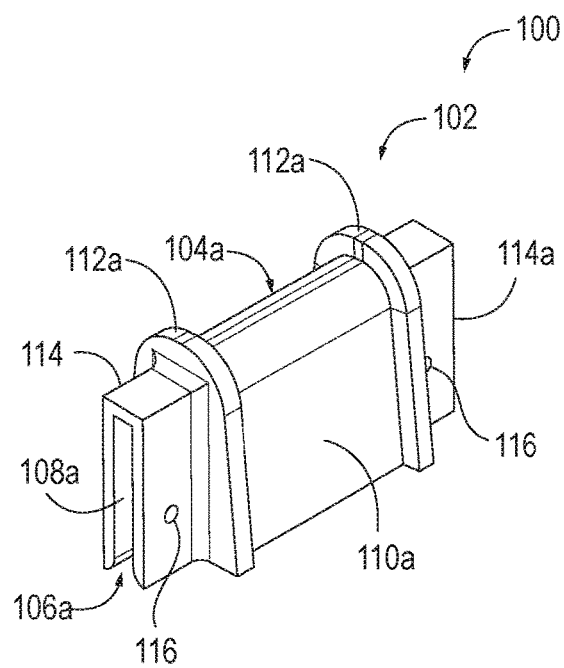
FIG. 5 is another isometric view of the fuel dam of FIG. 4.
Figure 6:
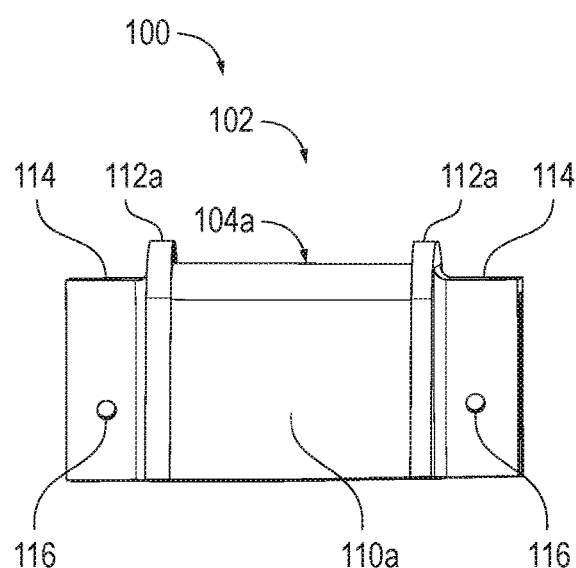
FIG. 6 is a side view of the fuel dam of FIG. 4.
Figure 7:
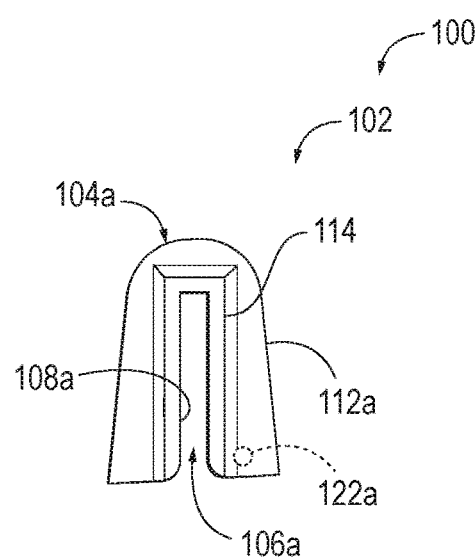
FIG. 7 is an end view of the fuel dam of FIG. 4.
Figure 8:
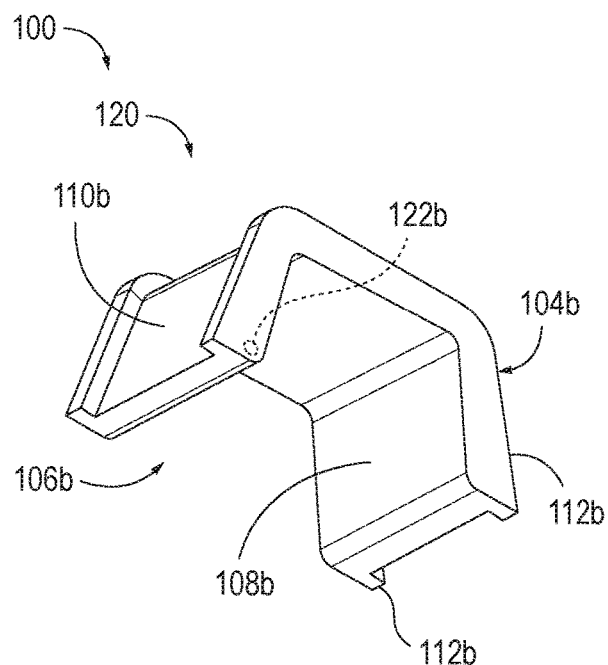
FIG. 8 is an isometric view of another example fuel dam.
Figure 9:
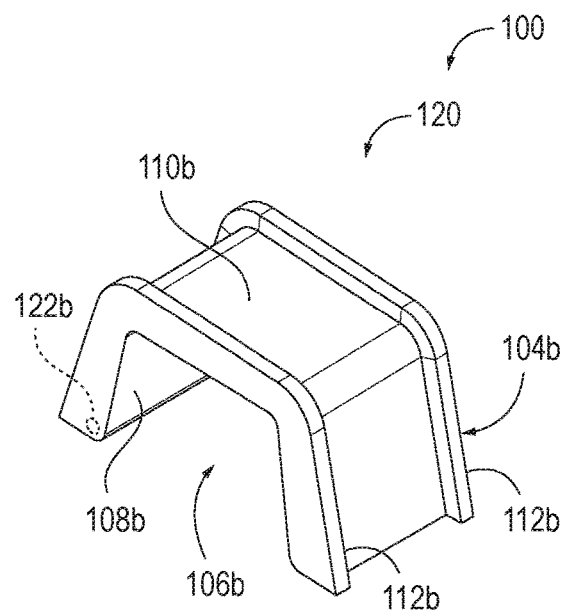
FIG. 9 is another isometric view of the fuel dam of FIG. 8.
Figure 10:
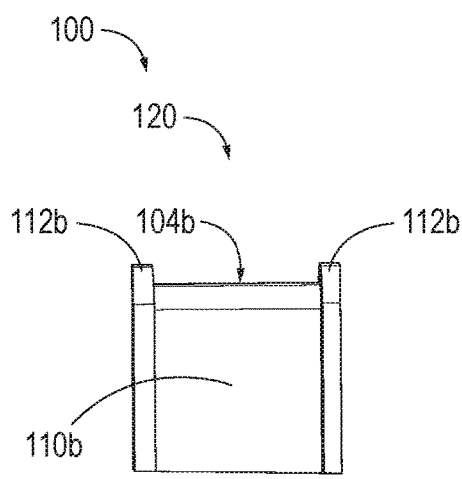
FIG. 10 is a side view of the fuel dam of FIG. 8.
Figure 11:
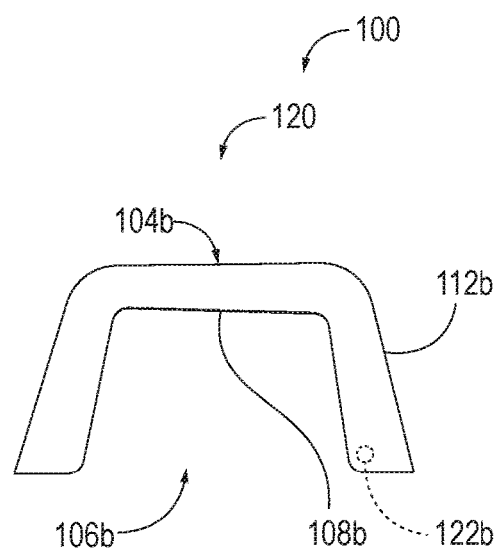
FIG. 11 is an end view of the fuel dam of FIG. 8.

Aircraft 10, aircraft wing boxes 36 thereof, and methods 200 of assembling aircraft wings 12 are disclosed herein. As schematically illustrated in FIG. 1, aircraft 10 comprise at least a fuselage 11 and wings 12 that are supported by the fuselage 11. Each wing 12 comprises an aircraft wing box 36. As schematically represented in FIG. 2, aircraft wing boxes 36 typically comprise front and rear spars 14, ribs 16 that are spaced apart and extend between the spars 14, and stringers 18 that are spaced apart and extend transverse to the ribs 16. The ribs 16 comprise notches 22, and the stringers 18 are positioned partially within the notches 22 of the ribs 16. Notches 22 additionally or alternatively may be described as mouseholes in the aerospace industry. As shown in FIG. 3, and in more detail in FIGS. 4-11, aircraft wing boxes 36 also typically comprise fuel dams 100 that are positioned at least a subset of interfaces 34 between the stringers 18 and the notches 22 of the ribs 16, such as at fuel flow control ribs and/or tank end ribs. The fuel dams 100 effectively seal the interfaces 34 to prevent or restrict fuel passing through the interfaces 34 at fuel tank boundaries or fuel tank baffles.

Various configurations of stringers 18 may be incorporated into an aircraft wing box 36, examples of which include stringers having T-shaped, I-shaped, J-shaped, Z-shaped, and hat-shaped cross-sections as generally known in the art. In the example assembly of FIG. 3, an example T-stringer 24 and an example hat stringer 30 are illustrated; however, the present disclosure is not limited to T-stringers and hat stringers. As illustrated, T-stringers 24 comprise a base 26 and a blade 28 extending from the base 26. Similarly, I-stringers, J-stringers, and Z-stringers may be described as comprising a base 26. The base 26 is coupled to a skin 20 of the aircraft wing 12. Hat stringers 30 typically comprise two base flanges 32 and a hat portion 35 extending away from and between the base flanges 32. The base flanges 32 are coupled to a skin 20 of the aircraft wing 12.

Examples of fuel dams 100 are illustrated in FIGS. 3-11. FIG. 3 illustrates a portion of an example wing box and shows example fuel dams 100 having two different configurations, specifically an example fuel dam for use with T-stringers, indicated at 102, and an example fuel dam for use with hat stringers, indicated at 120. FIGS. 4-7 illustrate several views of example fuel dam 102 for use with T-stringers 24, and FIGS. 8-11 illustrate several views of example fuel dam 120 for use with hat stringers 30. However, the examples shown in FIGS. 3-11 are non-exclusive and do not limit fuel dams 100 to the illustrated embodiments.

As shown in FIGS. 3-11, fuel dams 100 according to the present disclosure each comprise a fuel-dam body 104 (104a in the example of FIGS. 4-7, and 104b in the example of FIGS. 8-11) that defines a channel 106 (106a in the example of FIGS. 4-7, and 106b in the example of FIGS. 8-11) that is shaped to receive a portion of a stringer 18, such as to fit over a cross-section of a stringer 18. The two example embodiments of the fuel dams 100 that are illustrated in FIGS. 3-11 differ mainly in terms of the configuration of the fuel-dam body 104 and the channel 106, which are respectively shaped to accommodate a different type of stringer, with fuel dam 102 configured to accommodate a T-stringer, and fuel dam 120 shaped to accommodate a hat stringer. In either embodiment, the fuel-dam body 104 comprises a stringer adherent surface 108 (108a in the example of FIGS. 3-7, and 108b in the example of FIGS. 8-11), a rib adherent surface 110 (110a in the example of FIGS. 3-7, and 110b in the example of FIGS. 8-11), and a pair of spaced-apart flanges 112 (112a in the example of FIGS. 4-7, and 112b in the example of FIGS. 8-11). The stringer adherent surface 108 defines the channel 106 and is shaped to be adhered to the portion of the stringer 18 received within the channel 106. The rib adherent surface 110 is shaped to be adhered to a rib 16 within a notch 22 of the rib 16. The spaced-apart flanges 112 extend from the rib adherent surface 110 and are positioned to project from the rib adherent surface 110 on opposing sides of the notch 22 within which the stringer 18 is positioned. As a result, the spaced-apart flanges 112 serve to contain any excess adhesive, or sealant, that is squeezed out from between the rib adherent surface 110 and the notch 22 of the rib 16 within which the fuel dam 100 is installed. Indeed, in some examples, the containment of any excess adhesive by the spaced-apart flanges 112 may result in the excess adhesive not needing to be removed following installation of a fuel dam 100, resulting in an efficient installation process.

In some examples, the spaced-apart flanges 112 are generally parallel to each other. In some examples, the spaced-apart flanges 112 extend generally perpendicular from the rib adherent surface 110. As used herein "generally parallel" and "generally perpendicular" means within 10 degrees of parallel and perpendicular, respectively. The specific orientation of the spaced-apart flanges 112 relative to the remainder of the fuel-dam body 104 of a specific fuel dam 100 may be based on corresponding shapes, dimensions, and configurations of the corresponding rib 16 and notch 22, adjacent which the spaced-apart flanges 112 will be positioned when the fuel dam 100 is operatively installed.

In some examples, a fuel dam 100 is monolithic or unitary in structure, that is, in its final manufactured form, it is constructed from a single unitary piece of material, as opposed to an assembly of discrete components that are coupled together via fasteners and/or adhesives. For example, a fuel dam 100 may be additively manufactured or molded from a feedstock to form a monolithic body. Alternatively, a fuel dam 100 may be machined from a piece of material to form a monolithic body. Additionally or alternatively, a fuel dam 100 first may be molded or additively manufactured and subsequently machined to refine the final surfaces of the fuel dam 100. Fuel dams 100 may be constructed from any suitable material depending on the aircraft 10, such that the fuel dams 100 are compatible with aircraft fuel. For example, fuel dams 100 may be constructed from a metal, a plastic material, or a fiber-reinforced plastic material. Similarly, the spars 14, the ribs 16, the stringers 18, and the skins 20 of an aircraft wing 12 may be constructed from various materials, including metals, plastics, and fiber-reinforced plastics, depending on the construction of an aircraft 10. As an illustrative, non-exclusive example, fuel dams 100 may be constructed from a nylon material that is selected to be compliant with electromagnetic emission specifications of aircrafts.

In some examples of fuel dams 100, including the example fuel dam 102 of FIGS. 4-7, the fuel-dam body 104 comprises end regions 114 that extend beyond the spaced-apart flanges 112 and that partially define the channel 106 and the stringer adherent surface 108. When present, such end regions 114 provide a greater surface area for stringer adherent surface 108 to be adhered and coupled to a corresponding stringer 18. In some such examples, the end regions 114 comprise fastener holes 116 for operatively fastening the fuel dam 100 to a corresponding stringer 18. Some such examples of fuel dams 100 may be configured as non-hat fuel dams. Some fuel dams 100 according to the present disclosure are free of fastener holes and exclusively rely on an adhesive for being adhered and coupled to a corresponding stringer 18 and a corresponding rib 16.

As schematically and optionally illustrated in dashed lines in the example fuel dams of FIGS. 3-11, fuel dams 100 may include one or more holes 122 (122a in the example of FIGS. 3-7, and 122b in the example of FIGS. 8-11) extending through the fuel-dam body 104. In such examples, the fuel dams 100 may be used at fuel tank baffles where fuel and/or water is permitted to flow, or drain, from one side of a corresponding rib 16 to the other.

Turning now to FIG. 12, methods 200 of assembling aircraft wings 12 are schematically presented. In FIG. 12, some steps are illustrated in dashed boxes indicating that such steps may be optional or may correspond to an optional version of a method 200. That said, not all methods according to the present disclosure are required to include the steps illustrated in solid boxes. The methods and steps illustrated in FIG. 12 are not limiting and other methods and steps are within the scope of the present disclosure, including methods having greater than or fewer than the number of steps illustrated, as understood from the discussions herein. Moreover, the order of steps illustrated in FIG. 12 is not limiting, and the steps of methods 200 may be performed in any suitable order.

As schematically indicated in FIG. 12, methods 200 comprise adhering 202 fuel dams 100 to stringers 18, and adhering 204 the fuel dams 100 to at least a subset of ribs 16. In some examples of methods 200, adhering 202 the fuel dams 100 to the stringers 18 is performed prior to adhering 204 the fuel dams 100 to the ribs 16. In some such examples, the stringers 18 already may be coupled to a corresponding skin 20 when the fuel dams 100 are coupled to the stringers 18 or the fuel dams 100 may be adhered to the stringers 18 and then the combined stringers 18 and fuel dams 100 may be coupled to the corresponding skin 20. Then, the assembly of the skin 20, the stringers 18, and the fuel dams 100 may be coupled to the ribs 16, including adhering 204 the fuel dams 100 to the ribs 16. Such implementations of methods 200 provide for the operative placement of the fuel dams 100 on the stringers 18 in an open environment, spaced-away from the remainder of the wing 12 or wing box 36 being assembled, enabling more ergonomic assembling of wings 12 than traditional wing assembly methods.

That said, not all methods 200 require the adhering of step 202 to be performed prior to the adhering step 204, and in other examples of methods 200, the adhering of step 204 is performed prior to the adhering of step 202.

The adhering of step 202 and the adhering of step 204 may utilize any adhesive suitable for the materials of the ribs 16, the stringers 18, and the fuel dams 100, and the corresponding required strength and other specifications of an aircraft wing 12, as well as being compatible with aircraft fuel. Example adhesives include two-part, manganese dioxide cured polysulfide compounds and vulcanizing silicone rubber adhesives. Adhesives additionally or alternatively may be referred to as sealants.

As schematically indicated in FIG. 12, in some methods 200, the adhering of step 202 comprises adhering 206 the fuel dams 100 to the stringers 18 in predetermined locations along the stringers 18. Some such methods 200, therefore, may further comprise indexing 228 the fuel dams 100 relative to the stringers 18 to determine the predetermined locations. Proper positioning of the fuel dams 100 on the stringers 18 results in the fuel dams 100 being spaced apart from each other at the correct spacing in relation to the ribs 16.

With continued reference to FIG. 12, in some methods 200, the adhering of step 204 comprises positioning 208 the fuel dams 100 within respective notches 22 of the ribs 16.

Some methods 200 further comprise coupling 210 the stringers 18 to a skin 20. In some such methods 200, the coupling of step 210 is performed prior to the adhering of step 202. As discussed, such an order of assembly provides for the operative placement of the fuel dams 100 on the stringers 18 in an open environment, spaced-away from the remainder of the wing 12 or wing box 36 being assembled and resulting in more ergonomic assembling of wings 12 than traditional wing assembly methods.

With continued reference to FIG. 12, some methods 200 further comprise, prior to the adhering of step 202, acquiring 212 surface contour data of the stringers 18 and/or acquiring 214 surface contour data of the ribs 16, and then based on the surface contour data of the stringers 18 and/or the surface contour data of the ribs 16, refining 216 computer models of the fuel dams 100. In some such methods 200, coupling 210 is performed prior to the acquiring 212.

Various techniques may be utilized to acquire the surface contour data. For example, the surface contour data may be acquired from detailed reviews of tolerance allocations and/or by reviewing previous fabrication data to establish statistical bounds of the fuel dams. Additionally or alternatively, the surface contour data may be acquired by various three-dimensional (3D) scanning techniques, such as time-of-flight laser scanning, triangulation based laser scanning, structured light 3D scanning, modulated light 3D scanning, passive stereoscopic 3D imaging, photogrammetric non-contact passive methods, etc. The computer models may be computer-aided design (CAD) and/or computer-aided manufacturing (CAM) models or files, which generally may be described as 3D models. The acquiring of step 212, the acquiring of step 214, and/or the refining of step 216 of such methods 200 may be described as being computer-implemented steps of methods 200. Accordingly, such steps of methods 200 may be performed by or controlled by a controller, that is, any suitable device or devices that are configured to perform the recited functions of the acquiring of step 212, the acquiring of step 214, and/or the refining of step 216. For example, the controller may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure. Additionally or alternatively, one or more controllers may include, or be configured to read, non-transitory computer readable storage, or memory, media suitable for storing computer-executable instructions, or software, for implementing the acquiring of step 212, the acquiring of step 214, and/or the refining of step 216. Examples of such media include CD-ROMs, disks, hard drives, flash memory, etc. As used herein, storage, or memory, devices and media having computer-executable instructions as well as computer-implemented methods and steps according to the present disclosure are considered to be within the scope of subject matter deemed patentable in accordance with Section 101 of Title 35 of the United States Code.

As an example, a default computer model of a fuel dam 100 may be based on typical final dimensions of fuel dams 100 or based on the largest typical fuel dam 100 for a particular aircraft 10. The refining of step 216 manipulates the default computer model based on the acquired surface contour data of the stringers 18 and/or the ribs 16 to arrive at an updated computer model that has the desired dimensions of a specific fuel dam 100 based on a specific interface 34 between a specific stringer 18 and a specific rib 16 and based on desired tolerances. In particular, as schematically indicated in FIG. 12, in some methods 200, the refining of step 216 comprises defining 218 the stringer adherent surfaces 108 and/or the rib adherent surfaces 110 of the computer models of the fuel dams 100. That is, the default computer model has corresponding adherent surfaces, but the modeling of one or both of these surfaces is refined based on the acquired surface contour data of a specific stringer 18 and/or a specific rib 16 with which a specific fuel dam 100 will be installed at the corresponding interface 34 thereof. In more particular examples, the defining of step 218 comprises defining 220 spatial relationships between the stringer adherent surfaces 108 and the rib adherent surfaces 110 of the computer model for a particular fuel dam 100.

As schematically indicated in FIG. 12, some such methods 200 further comprise, following the refining of step 216, manufacturing 222 the fuel dams 100 based on the computer models. That is, custom fuel dams 100 are manufactured based on the surface contour data of the stringers 18 and/or the ribs 16 so that the fuel dams 100 meet appropriate dimensional tolerances of the actual aircraft wing box 36 being assembled.

In some methods 200, manufacturing 222 comprises additively manufacturing the fuel dams 100 based on the computer models. In some methods 200, manufacturing 222 comprises subtractively machining the fuel dams 100 based on the computer models. In some such methods 200, the additive manufacturing process may result in a final part with the desired dimensions. In other examples, a machining step may be performed following the additive manufacturing step to arrive at the final design dimensions of a fuel dam 100.

As schematically indicated in FIG. 12, in methods 200 that comprise positioning 208 the fuel dams 100 within respective notches 22 of the ribs 16, the positioning of step 208 comprises positioning 224 the pair of spaced-apart flanges 112 of each fuel-dam body 104 on opposing sides of the notch 22 of the respective rib 16.

In some methods 200, adhering 204 the fuel dams 100 to the ribs 16 comprises containing 226 adhesive squeezeout between the pair of spaced-apart flanges 112 and the respective rib 16. That is, as discussed, the spaced-apart flanges 112 may serve to contain any excess adhesive that is squeezed out from between the rib adherent surface 110 of a fuel dam 100 and a notch 22 of the rib 16 within which the fuel dam 100 is being installed. In fact, in some examples, the excess adhesive contained by the spaced-apart flanges 112 may not need to be removed following installation of a fuel dam 100, resulting in an efficient installation process. In particular, in some methods 200, the adhering of step 202 and/or the adhering of step 204 does not require removal or cleaning of excess adhesive.

In examples of methods 200 in which a fuel dam 100 comprises end regions 114 and fastener holes 116 extending therethough, such methods 200 also may comprise fastening 230 the fuel dams 100 to the stringers 18 with fasteners extending through the fastener holes 116 as schematically indicated in FIG. 12. In other methods 200, no fasteners are used to couple the fuel dams 100 to the stringers 18 and/or to the ribs 16.

Illustrative, non-exclusive examples of inventive subject matter according to the present disclosure are described in the following enumerated paragraphs:

A. A method (200) of assembling an aircraft wing (12), the method (200) comprising:

adhering (202) fuel dams (100) to stringers (18); and adhering (204) the fuel dams (100) to ribs (16).

A1. The method (200) of paragraph A, wherein the adhering (202) the fuel dams (100) to the stringers (18) is performed prior to the adhering (204) the fuel dams (100) to the ribs (16).

A2. The method (200) of paragraph A, wherein the adhering (204) the fuel dams (100) to the ribs (16) is performed prior to the adhering (202) the fuel dams (100) to the stringers (18).

A3. The method (200) of any of paragraphs A-A2, wherein the adhering (202) the fuel dams (100) to the stringers (18) comprises adhering (206) the fuel dams (100) to the stringers (18) in predetermined locations along the stringers (18).

A3.1. The method (200) of paragraph A3, further comprising indexing (228) the fuel dams (100) relative to the stringers (18) to determine the predetermined locations.

A4. The method (200) of any of paragraphs A-A3.1, wherein the adhering (204) the fuel dams (100) to the ribs (16) comprises positioning (208) the fuel dams (100) within respective notches (22) of the ribs (16).

A5. The method (200) of any of paragraphs A-A4, further comprising coupling (210) the stringers (18) to a skin (20).

A5.1. The method (200) of paragraph A5, wherein the coupling (210) the stringers (18) to the skin (20) is performed prior to the adhering (202) the fuel dams (100) to the stringers (18).

A6. The method (200) of any of paragraphs A-A5.1, further comprising prior to the adhering (202) the fuel dams (100) to the stringers (18):

acquiring (212) surface contour data of the stringers (18) and/or acquiring (214) surface contour data of the ribs (16); and based on the surface contour data of the stringers (18) and/or the surface contour data of the ribs (16), refining (216) computer models of the fuel dams (100).

A6.1. The method (200) of paragraph A6, wherein the refining (216) the computer models of the fuel dams (100) comprises defining (218) stringer adherent surfaces (108) and/or rib adherent surfaces (110) of the computer models of the fuel dams (100).

A6.1.1. The method (200) of paragraph A6.1, wherein the defining (218) the stringer adherent surfaces (108) and the rib adherent surfaces (110) of the computer models of the fuel dams (100) comprises defining (220) spatial relationships between the stringer adherent surfaces (108) and the rib adherent surfaces (110).

A6.2. The method (200) of any of paragraphs A6-A6.1.1, further comprising following the refining (216) the computer models of the fuel dams (100), manufacturing (222) the fuel dams (100) based on the computer models.

A6.2.1. The method (200) of paragraph A6.2, wherein the manufacturing (222) comprises additively manufacturing the fuel dams (100) based on the computer models.

A6.2.2. The method (200) of any of paragraphs A6.2-A6.2.1, wherein the manufacturing (222) comprises subtractively machining the fuel dams (100) based on the computer models.

A7. The method (200) of any of paragraphs A-A6.2.2, wherein each fuel dam (100) comprises a fuel-dam body (104) that defines a channel (106) shaped to receive a portion of a respective stringer (18), wherein the fuel-dam body (104) comprises:

a/the stringer adherent surface (108) that defines the channel (106) and is shaped to be adhered to the portion of the respective stringer (18);

a/the rib adherent surface (110) shaped to be adhered to a respective rib (16) within a/the notch (22) of the respective rib (16); and a pair of spaced-apart flanges (112) extending from the rib adherent surface (110) and positioned to project from the rib adherent surface (110) on opposing sides of the notch (22) of the respective rib (16).

A7.1. The method of paragraph A7, wherein the spaced-apart flanges (112) are generally parallel to each other.

A7.2. The method of any of paragraphs A7-A7.1, wherein the spaced-apart flanges (112) extend generally perpendicular from the rib adherent surface (110).

A7.3. The method of any of paragraphs A7-A7.2 when depending from paragraph A4, wherein the positioning (208) the fuel dams (100) comprises positioning (224) the pair of spaced-apart flanges (112) of each fuel-dam body (104) on opposing sides of the notch (22) of the respective rib (16).

A7.4. The method (200) of any of paragraphs A7-A7.3, wherein the adhering (204) the fuel dams (100) to the ribs (16) comprises containing (226) adhesive squeeze-out between the pair of spaced-apart flanges (112) and the respective rib (16).

A7.5. The method (200) of any of paragraphs A7-A7.4, wherein the fuel-dam body (104) comprises end regions (114) extending beyond the pair of spaced-apart flanges (112) and that partially define the channel (106).

A7.5.1. The method (200) of paragraph A7.5, wherein the end regions (114) comprise fastener holes (116).

A7.5.1.1. The method (200) of paragraph A7.5.1, further comprising fastening (230) the fuel dams (100) to the stringers (18) with fasteners extending through the fastener holes (116).

A7.6. The method (200) of any of paragraphs A7-A7.5.1.1, wherein each fuel dam (100) is monolithic in structure.

A8. The method (200) of any of paragraphs A-A7.6, wherein the adhering (202) the fuel dams (100) to the stringers (18) does not require removal or cleaning of excess adhesive.

A9. The method (200) of any of paragraphs A-A8, wherein the adhering (204) the fuel dams (100) to the ribs (16) does not require removal or cleaning of excess adhesive.

A10. The method (200) of any of paragraphs A-A9 but for paragraph A7.5.1.1, wherein no fasteners are used to couple the fuel dams (100) to the stringers (18).

A11. The method (200) of any of paragraphs A-A10, wherein no fasteners are used to couple the fuel dams (100) to the ribs (16).

B. A fuel dam (100) for an aircraft wing (12), comprising:

a fuel-dam body (104) that defines a channel (106) shaped to receive a portion of a stringer (18) of the aircraft wing (12), wherein the fuel-dam body (104) comprises:

a stringer adherent surface (108) that defines the channel (106) and is shaped to be adhered to the portion of the stringer (18) of the aircraft wing (12);

a rib adherent surface (110) shaped to be adhered to a rib (16) of the aircraft wing (12) within a notch (22) of the rib (16); and a pair of spaced-apart flanges (112) extending from the rib adherent surface (110) and positioned to project from the rib adherent surface (110) on opposing sides of the notch (22) of the rib (16).

B1. The fuel dam (100) of paragraph B, wherein the spaced-apart flanges (112) are generally parallel to each other.

B2. The fuel dam (100) of any of paragraph B-B1, wherein the spaced-apart flanges (112) extend generally perpendicular from the rib adherent surface (110).

B3. The fuel dam (100) of any of paragraphs B-B2, wherein the fuel dam (100) is monolithic in structure.

B4. The fuel dam (100) of any of paragraphs B-B3, wherein the fuel-dam body (104) comprises end regions (114) extending beyond the pair of spaced-apart flanges (112) and that partially define the channel (106).

B4.1. The fuel dam (100) of paragraph B4, wherein the end regions (114) comprise fastener holes (116).

B5. The fuel dam (100) of any of paragraphs B-B4, wherein the fuel dam (100) is free of fastener holes.

B6. Use of the fuel dam (100) of any of paragraphs B-B5 to seal an interface (34) between the stringer (18) and the rib (16).

C. An aircraft wing box (36), comprising:

spars (14);

ribs (16) extending between the spars (14) and comprising notches (22);

stringers (18) extending transverse to the ribs (16) and positioned partially within the notches (22); and a plurality of the fuel dams (100) of any of paragraphs B-B5 positioned at interfaces (34) between the stringers (18) and the notches (22) of at least a subset of the ribs (16).

D. An aircraft (10), comprising:

a fuselage (11); and wings (12) supported by the fuselage (11); wherein each wing (12) comprises an aircraft wing box (36) of paragraph C.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling an aircraft wing, the method comprising:

adhering fuel dams to stringers; and adhering the fuel dams to ribs, wherein the adhering the fuel dams to the ribs comprises adhering the fuel dams to respective surfaces of the ribs that define respective mouseholes of the ribs;

wherein each fuel dam comprises a fuel-dam body that defines a channel having a longitudinal axis and shaped to receive a portion of a respective stringer, wherein the fuel-dam body comprises:

a stringer adherent surface that defines the channel and is shaped to be adhered to the portion of the respective stringer;

a rib adherent surface opposite the stringer adherent surface and shaped to be adhered to a respective rib within a respective mousehole of the respective rib; and a pair of spaced-apart flanges extending from the rib adherent surface and generally perpendicular to the longitudinal axis of the channel and positioned to project from the rib adherent surface on opposing sides of the respective rib when the rib adherent surface is adhered to the respective rib within the respective mousehole of the respective rib, wherein the spaced-apart flanges are spaced apart along the longitudinal axis of the channel.

2. The method of claim 1, further comprising prior to the adhering the fuel dams to the stringers:

acquiring surface contour data of the stringers and/or acquiring surface contour data of the ribs; and based on the surface contour data of the stringers and/or the surface contour data of the ribs, refining computer models of the fuel dams.

3. The method of claim 2, wherein the refining the computer models of the fuel dams comprises defining the stringer adherent surfaces and/or the rib adherent surfaces of the computer models of the fuel dams.

4. The method of claim 3, wherein the defining the stringer adherent surfaces and the rib adherent surfaces of the computer models of the fuel dams comprises defining spatial relationships between the stringer adherent surfaces and the rib adherent surfaces.

5. The method of claim 2, further comprising, following the refining the computer models of the fuel dams, manufacturing the fuel dams based on the computer models.

6. The method of claim 5, wherein the manufacturing comprises additively manufacturing the fuel dams based on the computer models.

7. The method of claim 5, wherein the manufacturing comprises subtractively machining the fuel dams based on the computer models.

8. The method of claim 1, wherein the adhering the fuel dams to the stringers comprises adhering the fuel dams to the stringers in predetermined locations along the stringers.

9. The method of claim 8, further comprising indexing the fuel dams relative to the stringers to determine the predetermined locations.

10. The method of claim 1, further comprising coupling the stringers to a skin.

11. The method of claim 10, wherein the coupling the stringers to the skin is performed prior to the adhering the fuel dams to the stringers.

12. The method of claim 1, wherein the adhering the fuel dams to the stringers is performed prior to the adhering the fuel dams to the ribs.

13. The method of claim 1, wherein the adhering the fuel dams to the ribs is performed prior to the adhering the fuel dams to the stringers.

14. The method of claim 1, wherein the adhering the fuel dams to the ribs comprises containing adhesive squeezeout between the pair of spaced-apart flanges and the respective rib.

15. The method of claim 1, wherein each fuel dam is monolithic in structure.

16. The method of claim 1, wherein no fasteners are used to couple the fuel dams to the stringers, and wherein no fasteners are used to couple the fuel dams to the ribs.

17. A fuel dam for an aircraft wing, comprising:
   a fuel-dam body that defines a channel having a longitudinal axis and shaped to receive a portion of a stringer of the aircraft wing, wherein the fuel-dam body comprises:
      a stringer adherent surface that defines the channel and is shaped to be adhered to the portion of the stringer of the aircraft wing;
      a rib adherent surface opposite the stringer adherent surface and shaped to be adhered to a rib of the aircraft wing within a notch of the rib; and
      a pair of spaced-apart flanges extending generally perpendicular from the rib adherent surface and generally perpendicular to the longitudinal axis of the channel and positioned to project from the rib adherent surface on opposing sides of the rib when the rib adherent surface is adhered to the rib within the notch of the rib, wherein the spaced-apart flanges are spaced apart along the longitudinal axis of the channel.

18. An aircraft wing box, comprising:
   spars;
   ribs extending between the spars and comprising notches;
   stringers extending transverse to the ribs and positioned partially within the notches; and
   a plurality of fuel dams of claim 17 positioned at interfaces between the stringers and the notches of at least a subset of the ribs.

19. An aircraft wing box, comprising:
   spars;
   ribs extending between the spars and comprising mouseholes;
   stringers extending transverse to the ribs and positioned partially within the mouseholes; and
   a plurality of fuel dams positioned at interfaces between the stringers and the mouseholes of at least a subset of the ribs;
   wherein at one or more of the interfaces, a respective fuel dam comprises:
      a fuel-dam body that defines a channel having a longitudinal axis, wherein the channel receives a portion of a respective stringer, wherein the fuel-dam body comprises:
         a stringer adherent surface that defines the channel and is adhered to the portion of the respective stringer;
         a rib adherent surface opposite the stringer adherent surface and adhered to a respective rib within a respective mousehole of the respective rib; and
         a pair of spaced-apart flanges spaced apart along the longitudinal axis of the channel and extending from the rib adherent surface and generally perpendicular to the longitudinal axis of the channel, wherein the pair of spaced-apart flanges project from the rib adherent surface on opposing sides of the respective rib.

20. The aircraft wing box of claim 19, wherein no fasteners are used to couple the fuel dams to the stringers, and wherein no fasteners are used to couple the fuel dams to the ribs.

* * * * *